United States Patent
Mathews et al.

(10) Patent No.: US 10,291,714 B2
(45) Date of Patent: May 14, 2019

(54) SYSTEM AND METHOD FOR USING GENERAL SOFTWARE TO CONTROL INTERNET OF THINGS (IOT) SYSTEM

(71) Applicant: American Megatrends, Inc., Norcross, GA (US)

(72) Inventors: Santhosh Samuel Mathews, Chennai (IN); Joseprabu Inbaraj, Suwanee, GA (US); Chandrasekar Rathineswaran, Duluth, GA (US); Manikandan Palaniappan, Chennai (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 195 days.

(21) Appl. No.: 15/648,882

(22) Filed: Jul. 13, 2017

(65) Prior Publication Data

US 2019/0020718 A1 Jan. 17, 2019

(51) Int. Cl.
| | | |
|---|---|---|
| *H04L 29/08* | (2006.01) | |
| *H04L 12/66* | (2006.01) | |
| *H04L 12/26* | (2006.01) | |
| *H04W 88/16* | (2009.01) | |
| *H04L 12/28* | (2006.01) | |

(52) U.S. Cl.
CPC ............ *H04L 67/125* (2013.01); *H04L 12/66* (2013.01); *H04L 43/0811* (2013.01); *H04L 67/26* (2013.01); *H04L 12/2816* (2013.01); *H04L 12/2818* (2013.01); *H04L 67/18* (2013.01); *H04W 88/16* (2013.01)

(58) Field of Classification Search
CPC .. H04W 88/16; H04L 67/125; H04L 12/2816; H04L 12/2818
See application file for complete search history.

(56) References Cited

U.S. PATENT DOCUMENTS

| | | | | |
|---|---|---|---|---|
| 2007/0174033 | A1* | 7/2007 | Huang | G06F 13/105 703/24 |
| 2012/0011402 | A1* | 1/2012 | Chen | G06F 11/2284 714/25 |
| 2015/0201022 | A1* | 7/2015 | Kim | H04W 4/70 709/203 |
| 2017/0097880 | A1* | 4/2017 | Yeh | G06F 11/3003 |
| 2017/0105171 | A1* | 4/2017 | Srivastava | H04L 67/327 |

(Continued)

*Primary Examiner* — Jeong S Park
(74) *Attorney, Agent, or Firm* — Locke Lord LLP; Tim Tingkang Xia, Esq.

(57) ABSTRACT

Systems and methods for using general software to control an internet of things (IOT) system with a virtual baseboard management controller (BMC). The system includes a cloud network server provided on a cloud network. When the cloud network server receive a gateway registration request from an IOT gateway device communicatively connected to multiple IOT devices, the cloud network server provides a virtual BMC, and registers the IOT gateway device to the virtual BMC. The virtual BMC may then allow an IOT software to register to the virtual BMC, thus enabling the IOT software to access the IOT gateway device and the IOT devices via the virtual BMC. The virtual BMC may send information to the IOT gateway device registered to the virtual BMC by a push technology. The IOT gateway device and the IOT software may respectively communicate with the virtual BMC using Intelligent Platform Management Interface (IPMI) messages.

25 Claims, 7 Drawing Sheets

(56) References Cited

U.S. PATENT DOCUMENTS

2017/0126577 A1* 5/2017 Sender .................... H04L 47/70
2017/0353859 A1* 12/2017 Idnani ................... H04W 12/08
2018/0007140 A1* 1/2018 Brickell ............... H04L 67/125
2018/0113833 A1* 4/2018 Chen ..................... G06F 3/0227
2019/0014004 A1* 1/2019 Horiuchi ................ G06F 13/00

* cited by examiner

SYSTEM AND METHOD FOR USING GENERAL SOFTWARE TO CONTROL INTERNET OF THINGS (IOT) SYSTEM

FIELD

The present disclosure relates generally to internet of things (IOT) and baseboard management controller (BMC) technology, and more particularly to systems and methods for using general software to control an IOT system with a virtual BMC.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internet of things (IOT) is a relatively new developing technology. Specifically, IOT technology involves internetworking of physical devices, vehicles, buildings, and other items, which may be embedded with electronics, software, sensors, actuators, and network connectivity that enable these objects to collect and exchange data. Generally, the sensors and actuators used in the IOT devices may be provided by different vendors or manufacturers. Since there is no existing standard for the vendors or manufacturers to define and share the capabilities of the sensors and actuators, there is no simple and generic way of accessing the IOT devices of a system from a generic software application.

Therefore, an unaddressed need exists in the art to address the aforementioned deficiencies and inadequacies.

SUMMARY

Certain aspects of the present disclosure relate to a system, which includes a a cloud network server provided on a cloud network. The a cloud network server is configured to: receive a gateway registration request from an internet of things (IOT) gateway device communicatively connected to a plurality of IOT devices; in response to the gateway registration request, provide a virtual baseboard management controller (BMC) at the cloud network server, and register the IOT gateway device to the virtual BMC; and send an accepting response to the IOT gateway device to indicate that the IOT gateway device is registered to the virtual BMC. The virtual BMC is configured to: send information to the IOT gateway device registered to the virtual BMC by a push technology, and receive a software registration request from an IOT software executed at a remote computing device for registering the IOT software to the virtual BMC, such that the IOT software registered to the virtual BMC is capable of requesting data from the IOT gateway device or each of the IOT devices connected to the IOT gateway device via the virtual BMC. Each of the IOT gateway device and the IOT software registered to the virtual BMC is configured to communicate with the virtual BMC by Intelligent Platform Management Interface (IPMI) messages.

Certain aspects of the present disclosure relate to a method for controlling an IOT system. In certain embodiments, the method includes: receiving, at a cloud network server, a gateway registration request from an IOT gateway device communicatively connected to a plurality of IOT devices; in response to the gateway registration request, providing a virtual BMC at the cloud network server, and registering the IOT gateway device to the virtual BMC; and sending, by the cloud network server, an accepting response to the IOT gateway device to indicate that the IOT gateway device is registered to the virtual BMC. The virtual BMC is configured to: send information to the IOT gateway device registered to the virtual BMC by a push technology, and receive a software registration request from an IOT software executed at a remote computing device for registering the IOT software to the virtual BMC, such that the IOT software registered to the virtual BMC is capable of requesting data from the IOT gateway device or each of the IOT devices connected to the IOT gateway device via the virtual BMC. Each of the IOT gateway device and the IOT software registered to the virtual BMC is configured to communicate with the virtual BMC by IPMI messages.

Certain aspects of the present disclosure relate to a non-transitory computer readable medium storing computer executable code. In certain embodiments, the computer executable code, when being executed at a processor of a cloud network server provided on a cloud network, is configured to: receive a gateway registration request from an IOT gateway device communicatively connected to a plurality of IOT devices; in response to the gateway registration request, provide a virtual BMC at the cloud network server, and register the IOT gateway device to the virtual BMC; and send an accepting response to the IOT gateway device to indicate that the IOT gateway device is registered to the virtual BMC. The virtual BMC is configured to: send information to the IOT gateway device registered to the virtual BMC by a push technology, and receive a software registration request from an IOT software executed at a remote computing device for registering the IOT software to the virtual BMC, such that the IOT software registered to the virtual BMC is capable of requesting data from the IOT gateway device or each of the IOT devices connected to the IOT gateway device via the virtual BMC. Each of the IOT gateway device and the IOT software registered to the virtual BMC is configured to communicate with the virtual BMC by IPMI messages.

In certain embodiments, the gateway registration request sent by the IOT gateway device to the cloud network server comprises a universally unique number (UUN) identifying the IOT gateway device, and the UUN is stored in a virtual memory of the virtual BMC to indicate that the IOT gateway device is registered to the virtual BMC. In certain embodiments, the UUN is a universally unique identifier (UUID) of the IOT gateway device, an International Mobile Equipment Identity (IMEI) number of the IOT gateway device, a media access control (MAC) address of the IOT gateway device, or a custom identification number mapped to geographical information of the IOT gateway device.

In certain embodiments, the virtual BMC is configured to send the information to the IOT gateway device registered to the virtual BMC by the push technology by: detecting an on-line status of the IOT gateway device; and when the on-line status of the IOT gateway device indicates the IOT gateway device to be offline, periodically re-checking the on-line status of the IOT gateway device.

In certain embodiments, the virtual BMC is configured to register the IOT software executed at the remote computing device by: in response to the software registration request, sending an accepting response to the IOT software executed at the remote computing device to indicate that the IOT software is registered to the virtual BMC.

In certain embodiments, the virtual BMC is further configured to: receive a first IPMI message from the IOT gateway device registered to the virtual BMC, wherein the first IPMI message comprises data of the IOT devices communicatively connected to the IOT gateway device registered to the virtual BMC; and retrieve the data of the IOT devices from the first IPMI message, and store the data of the IOT devices in a virtual memory of the virtual BMC.

In certain embodiments, the virtual BMC is further configured to: receive a first IPMI request message from the IOT software registered to the virtual BMC, wherein the first IPMI request message comprises a gateway access instruction to request the data of the IOT devices from the IOT gateway device registered to the virtual BMC; send the gateway access instruction to the IOT gateway device by the push technology; receive a first IPMI response message as the first IPMI message from the IOT gateway device; and respond to the gateway access instruction by sending the first IPMI response message to the IOT software.

In certain embodiments, the virtual BMC is further configured to: in response to not receiving the IPMI response message from the IOT gateway device, respond to the gateway access instruction by: generating a second IPMI message comprising the data of the IOT devices in a virtual memory of the virtual BMC, and sending the second IPMI message to the IOT software.

In certain embodiments, the virtual BMC is further configured to: receive a second IPMI request message from the IOT software registered to the virtual BMC, wherein the second IPMI request message comprises a device access instruction to request data from a target IOT device of the IOT devices; send the device access instruction to the IOT gateway device by the push technology; receive a second IPMI response message from the IOT gateway device, wherein the second IPMI response message comprises the data being requested from the target IOT device; and respond to the device access instruction by sending the second IPMI response to the IOT software.

In certain embodiments, the virtual BMC is further configured to: receive a third IPMI message from the IOT gateway device registered to the virtual BMC, wherein the third IPMI message comprises an alert from one of the IOT devices; and send the third IPMI message to the IOT software registered to the virtual BMC.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1A:
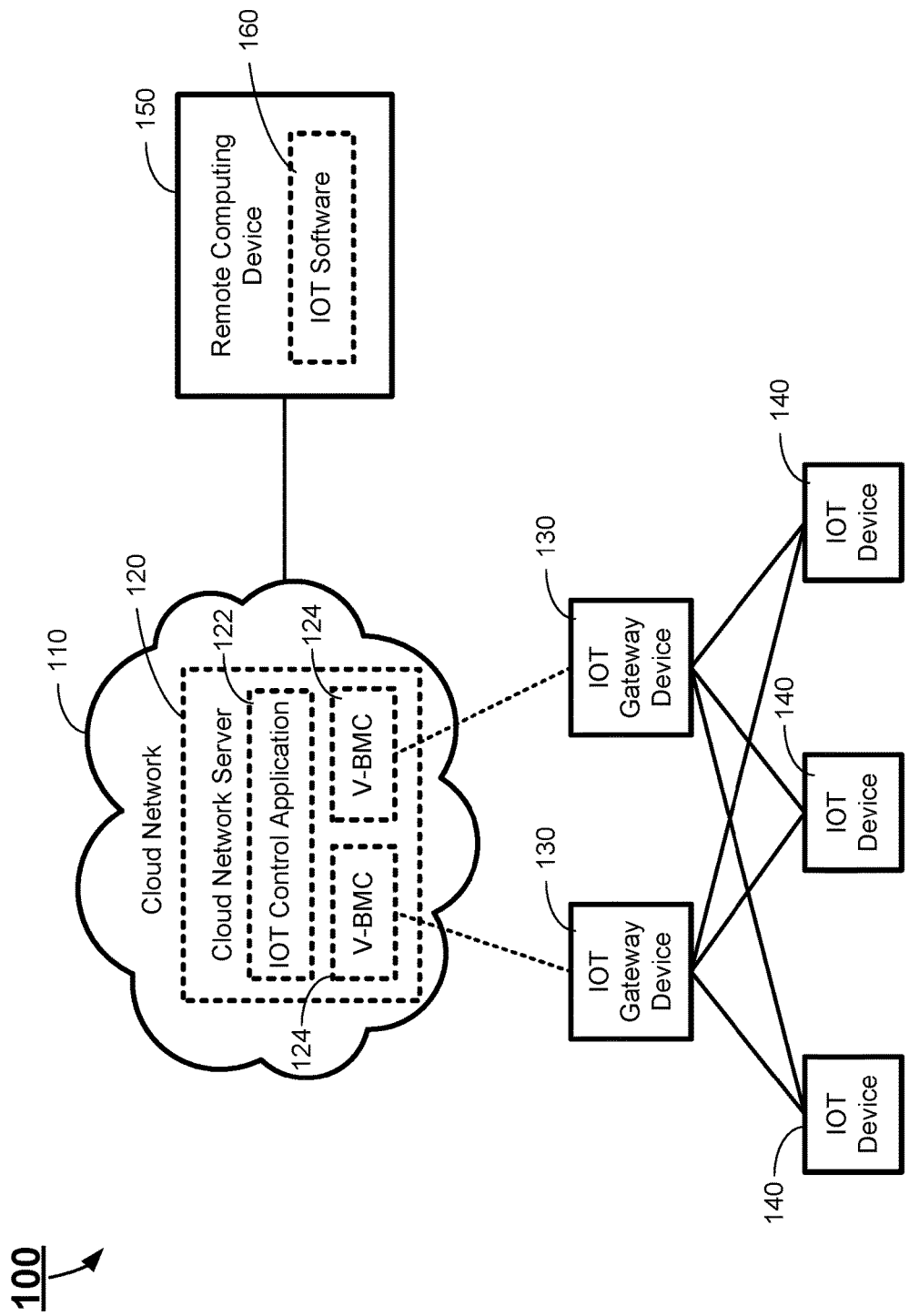
FIG. 1A schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refers to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

As discussed above, there is no existing standard for the vendors or manufacturers to define and share the capabilities of the sensors and actuators, there is no simple and generic way of accessing the IOT devices of a system from a generic software application. To address this deficiency, certain aspects of the present disclosure relate to systems and methods for using general software to control an IOT system with a virtual BMC, which provides a generic and feasible way of accessing a group of IOT devices and IOT gateways by the Intelligent Platform Management Interface (IPMI) standard. IPMI is an industry standard and is described in, e.g., "IPMI: Intelligent Platform Management Interface Specification, Second Generation, v.2.0, Feb. 12, 2004," which is incorporated herein by reference in its entirety. IPMI defines a protocol, requirements and guidelines for implementing a management solution for server-class computer systems. The features provided by the IPMI standard include power management, system event logging, environmental health monitoring using various sensors, watchdog timers, field replaceable unit information, in-band and out-of-band access to the management controller, simple network management protocol (SNMP) traps, etc. In certain embodiments, a virtual BMC is deployed in the cloud network and accessed by the IOT infrastructure as well as by the generic software. In this way, it may be efficient for a user to use the generic software to access the IOT system, even if any of the IOT devices in the system is offline for a period using push notifications.

FIG. 1A schematically depicts an exemplary system according to certain embodiments of the present disclosure. As shown in FIG. 1A, the system 100 includes a cloud network 110, which utilizes multiple computing resources to provide a cloud network server 120. The cloud network server 120 includes an IOT control application 122, and a plurality of virtual BMCs (V-BMCs) 124. Further, a plurality of IoT gateway devices 130 are respectively communicatively connected to the cloud network 110, and each of the IOT gateway devices 130 is respectively connected to a plurality of IOT devices 140. As shown in FIG. 1, each IOT gateway device 130 is correspondingly connected to a V-BMC 124. Further, the system 100 may further include a remote computing device 150, which is communicatively connected to the cloud network 110. An IOT software 160 is installed in the remote computing device 150, such that a user (such as an end user of one of the IOT devices 140) may use the IOT software 160 to remotely connect to one of the V-BMCs 124 in the cloud network server 120, in order to access the corresponding IOT device 140 via the V-BMC 124 and the IOT gateway device 130. In this case, the IOT software 160 does not need to be directly connected to the IOT gateway devices 130.

The cloud network 110 is an Internet-based network that provides shared computing resources (e.g., processors, memory, storage devices, network interfaces) and data on demand. In certain embodiments, the cloud network 110 includes a shared pool of configurable computing resources. Examples of the configurable computing resources may include, without being limited thereto, a plurality of networks, servers, computing devices, processors, storage devices, applications, services, or other hardware and/or software components. In certain embodiments, the cloud network 110 utilizes the computing resources to form the cloud network server 120. It should be noted that the cloud network server 120 may be implemented by physical computing resources or virtual computing resources. In certain embodiments, the cloud network 110 may be a private cloud network or a public cloud network, and may be of various forms.

As discussed above, the cloud network server 120 includes an IOT control application 122 and a plurality of V-BMCs 124. The IOT control application 122 is a software application used to initiate and configure the V-BMCs 124, such that the IOT software 160 at the remote computing device 150 and the IOT gateway devices 130 may be registered to the V-BMCs 124 in order to perform IOT communications.

Each of the V-BMCs 124 is a virtual BMC, which includes all of the functionalities of a BMC. For example, each V-BMC 124 may have its own virtual processor and virtual memory (not shown), and may include all the necessary firmware and modules to enable operation of the V-BMC 124. In certain embodiments, the virtual memory of the V-BMC 124 may be a virtual SDR. In certain embodiments, each V-BMC 124 has an IPMI module (not shown) to control the IPMI communications of the V-BMC 124, and a push module (not shown) to send out data by a push technology. Thus, the V-BMC 124 may receive IPMI communications from the corresponding IOT gateway device 130 and the IOT software 160. Further, the virtual BMC 124 may send information to the corresponding IOT gateway device 130 by the push technology.

Each of the IOT gateway devices 130 is a gateway device that functions as an intermediate device between the IOT devices 140 and the IOT software 160 at the remote computing device 150. As shown in FIG. 1A, each of the IOT gateway devices 130 corresponds one-to-one to a V-BMC 124 at the cloud network server 120, such that the IOT gateway device 130 may communicate with the corresponding V-BMC 124 at the cloud network server 120 via a communication protocol, such as Ethernet, Wi-Fi, a mobile network such as Global System for Mobile (GSM) or Code Division Multiple Access (CDMA), or any other proper communication protocols. In this case, the IOT gateway devices 130 do not communicate directly with the IOT software 160. Instead, the communication between the IOT software 160 and the IOT gateway device 130 may be achieved via the corresponding V-BMC 124.

Each of the IOT devices 140 is a device with IOT functionalities, which communicates with the V-BMC 124 at the cloud network server 120 via at least one of the IOT gateway devices 130. In certain embodiments, each IOT device 140 may include one or more sensors, one or more actuators, or a combination of sensors and actuators, based on the required IOT functionalities of the IOT device 140. As shown in FIG. 1A, each IOT device 140 communicates to two IOT gateway devices 130. It should be noted that the communication between each IOT device 140 and each IOT gateway device 130 may be via one or more communication interfaces, such as Bluetooth, Zigbee, Wi-Fi, Ethernet, or any other communication interfaces.

The remote computing device 150 is a computing device that a user may directly operation, and the IOT software 160 is a software application installed on the remote computing device 150, and is used by the user to remotely control the IOT devices 140. In certain embodiments, the remote computing device 150 includes necessary computer resources, such as a processor, a memory, a storage device, network interface, or other hardware components and software components (not shown) to perform its corresponding tasks. Examples of these hardware and software components of the remote computing device 150 may include, but not limited to, other required memory, interfaces, buses, Input/Output (I/O) modules and peripheral devices. In certain embodiments, the remote computing device 150 may be a computer used for general or specific purposes, such as a desktop computer, a laptop computer, a mobile device, a smartphone, a tablet, or any other computing device on which the IOT software 160 may be executed. As shown in FIG. 1A, the IOT software 160 communicates with the cloud network server 120, in order to access the IOT devices 140 via one of the V-BMCs 124 and the corresponding IOT gateway device 130.

In certain embodiments, the IOT software 160 may be a third-party software application developed by a developer who is not a manufacturer or vendor of the IOT devices 140 and/or the IOT gateway devices 130. In certain embodiments, the IOT software 160 may be a stand-alone software application or a web-based application. Since there is no standard implementation of the IOT systems, each manufacturer or vendor of the IOT devices 140 and/or the IOT gateway devices 130 may implement its own standard. Thus, it may be difficult for the developer of the IOT software 160 to implement an application that meets all of the different standards adopted by different IOT devices 140 and/or different IOT gateway devices 130. In certain embodiments, the IOT software 160 may be a generic software application, which may connect to the V-BMC 124 based on Latitude/Longitude or geographical address, authenticate, enquire the sensor details and name, select the relevant name and get the current value. In certain embodiments, the IOT software 160 may also be written in a very specific way so that it is simple and easy to use. For example, the IOT software 160 may be a specific software application written for a particular use, such as for an agricultural farm, to accept the address, connect to the V-BMC 124, authenticate and show the plot details, sprinkler information and color coded humidity/moister of each square feet area in the plot.

Figure 1B:
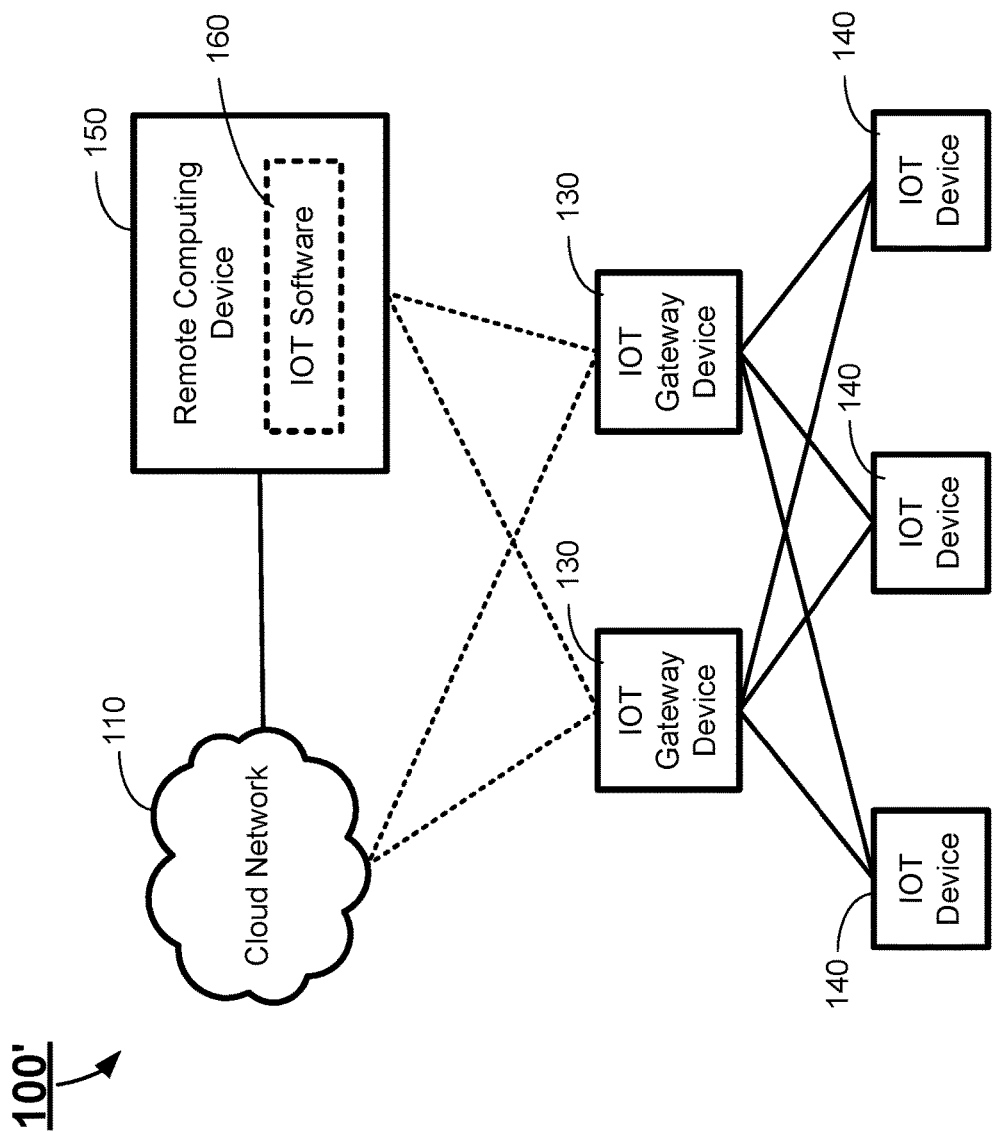
FIG. 1B schematically depicts an exemplary system which does not have a cloud network server according to a comparison embodiment of the present disclosure.

FIG. 1B schematically depicts an exemplary system which does not have a cloud network server according to a comparison embodiment of the present disclosure. As shown in FIG. 1B, the system 100' includes similar components to those as shown in FIG. 1A, with the exception that the cloud network 110 does not have a cloud network server 120 and the corresponding software components, such as the IOT control application 122 and the V-BMCs 124. In this case, the cloud network 110 is merely provided to function as a database, allowing the IOT gateway devices 130 and/or the IOT software 160 to transmit data of the IOT devices 140 to the cloud network 110 and store the data for backup or log purposes. Further, as shown in FIG. 1B, the IOT software 160 at the remote computing device 150 may communicate with the IOT gateway devices 130 directly, provided that the IOT software 160 is designed to meet the standard of each of the IOT gateway devices 130.

However, in the system 100' as shown in FIG. 1B, if there is a manufacturer or vendor of a specific IOT gateway device 130 that adopts a standard not supported by the IOT software 160, the IOT software 160 cannot communicate with this specific IOT gateway device 130. In this case, the user may have to install a specific IOT software dedicated to this specific IOT gateway device 130 in order to control the IOT devices 140 via this specific IOT gateway device 130. Further, it is possible that each of the IOT gateway devices 130 may frequently go offline, idle or sleep to increase the battery life or to reduce the operation cost of the network usage. In this case, the IOT software 160 may not be capable of connecting to the IOT gateway device 130 in the offline, idle or sleep status. Similarly, if the remote computing device 150 is in an outside network, the IP address allocation to the remote computing device 150 may be dynamic, and it may vary from time to time. In this case, a communication from the IOT gateway devices 130 from the IOT software 160 in the outside network may be simply denied due to security reasons, since the IOT gateway devices 130 may be provided behind a firewall. Alternatively, in order to enable such communication to the IOT gateway devices 130 from the IOT software 160 in the outside network, additional authentication and safeguard features of the system 100' must be implemented to ensure the security of the system 100', thus increasing the complexity and cost of the system 100'.

Therefore, referring back to FIG. 1A, each of the V-BMCs 124 provided on the cloud network server 120 function as an intermediate feature, which allows the IOT software 160 to communicate with the corresponding IOT gateway 130 via the V-BMC 124 in order to access the IOT devices 140. In operation, each of the IOT gateway devices 130 may communicate with the cloud network server 120 to register to a corresponding V-BMC 124. The IOT software 160 may also register to the virtual BMC 124. Thus, for the V-BMC 124, the IOT gateway device 130 and the IOT software 160 registered to the virtual BMC 124 may respectively communicate with the virtual BMC 124 by IPMI messages. Further, the virtual BMC 124 may send information to the corresponding IOT gateway device 130 registered to the virtual BMC 124 by a push technology. In this case, since IPMI is used, the different standards adopted by each of the IOT gateway devices 130 may be irrelevant, and a generic software supporting the IPMI communication may be used as the IOT software 160.

Figure 2:
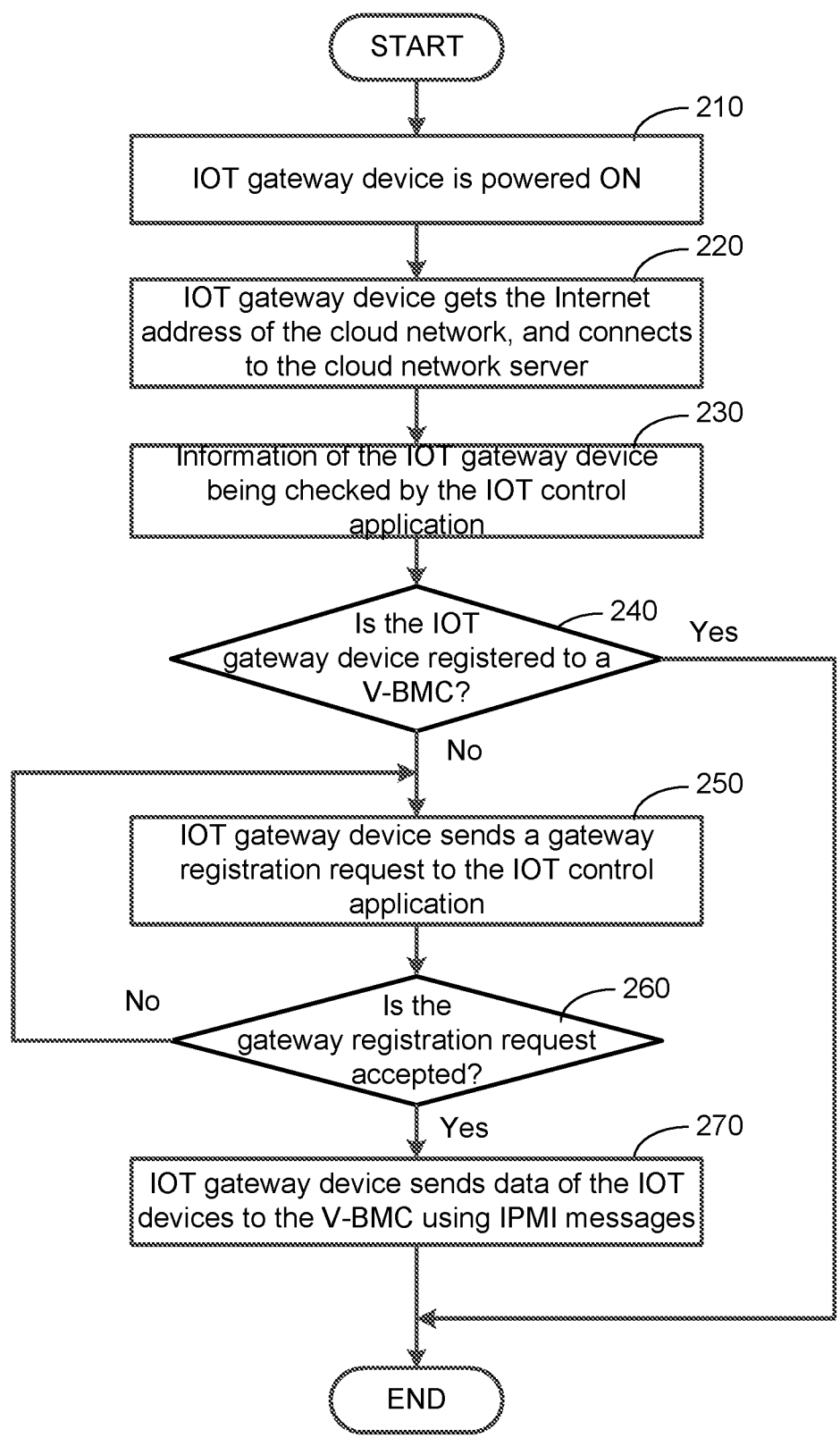
FIG. 2 depicts a process of an IOT gateway device being registered to the V-BMC according to certain embodiments of the present disclosure.

FIG. 2 depicts a process of an IOT gateway device being registered to the V-BMC according to certain embodiments of the present disclosure. In certain embodiments, the process or method as shown in FIG. 2 may be implemented on a system as shown in FIG. 1A. It should be particularly noted that, unless otherwise stated in the present disclosure, the steps of the method may be arranged in a different sequential order, and are thus not limited to the sequential order as shown in FIG. 2.

As shown in FIG. 2, at procedure 210, an IOT gateway device 130 is powered on. It should be noted that, before being powered on, the IOT gateway device 130 may be in an offline, idle or sleep state, and the IOT gateway device 130 may be already registered to a corresponding V-BMC 124 of the system 100, or may be a new IOT gateway device 130 that requires registration. At procedure 220, the IOT gateway device gets the Internet address of the cloud network 110, and connects to the cloud network server 120 on the cloud network 110. The communication protocol used in the connection between the IOT gateway device 130 and the cloud network 110 may be, without being limited thereto, communication protocol, wire or wireless protocols, such as Ethernet, Wi-Fi, or a mobile network such as Global System for Mobile (GSM) or Code Division Multiple Access (CDMA).

Once the connection is established, at procedure 230, the IOT gateway device 130 will wait for the IOT control application 122 at the cloud network server 120 to check the information of the IOT gateway device 130. In certain embodiments, each IOT gateway device 130 may be identifiable using a universally unique number (UUN) and its Internet protocol (IP) address. Examples of the UUN may include, without being limited thereto, a universally unique identifier (UUID) of the IOT gateway device 130, an International Mobile Equipment Identity (IMEI) number of the IOT gateway device 130, a media access control (MAC) address of the IOT gateway device 130, or a custom identification number mapped to geographical information of the IOT gateway device 130. For example, the custom identification number may be determined by an encryption formula, which uses the Latitude/Longitude numbers or the geographical address number of the place where the IOT gateway device 130 is physically located as the input. For example, if an IOT gateway device 130 is located at a place where the Latitude/Longitude numbers is 12.3456/80.1234, and the geographical address is "PQR Place/Road 45/Street 3/Abed farm", a number "456788833435345" may be generated based on the geographical information as the UUN of the IOT gateway device 130. If an IOT gateway device 130 is located at a place where the Latitude/Longitude numbers is 12.9786/90.2345, and the geographical address is "Chennai/XYZ area/plot 34/House 65", a number "452343243243456" may be generated based on the geographical information as the UUN of the IOT gateway device 130. When the IOT control application 122 receives the UUN and the IP address of the IOT gateway device 130, the IOT control application 122 may store the information in a map file on the cloud network server 120, such that the information may be used by the V-BMC 124 as well as the IOT software 160.

At procedure 240, once the IOT control application 122 checks the information of the IOT gateway device 130 and returns the result, the IOT control application 122 may determine, based on the result, whether the IOT gateway device 130 is registered to a V-BMC 124. If the IOT gateway device 130 is registered to a V-BMC 124, there is no further action required. If the IOT gateway device 130 is a new one, which is not currently registered to a V-BMC 124, at procedure 250, the IOT gateway device 130 may send a gateway registration request to the IOT control application 122 in order to register the IOT gateway device 130 to a V-BMC 124. In certain embodiments, the gateway registration request may include the same information to identify the IOT gateway device 130, such as the UUN and the IP address. In this case, the IOT control application 122 may assign or create a V-BMC 124 to the IOT gateway device 130, and store the information (such as the UUN and the IP address) of the IOT gateway device 130. In certain embodiments, the registration process may be a multi-layered process, including a process for registering the IOT gateway device 130 to the V-BMC 124 and a process for registering the IOT gateway device 130 to the feature of the push technology provided on the V-BMC 124. At the end of the registration process, the IOT control application 122 may then send an accepting response to the IOT gateway device 130 to indicate that the IOT gateway device 130 is successfully registered to the virtual BMC 124.

At procedure 260, the IOT gateway device 130 may determine, based on the accepting response received from the IOT control application 122, whether the gateway registration request is accepted (i.e., whether a corresponding V-BMC 124 is assigned to the IOT gateway device 130). If no accepting response is received from the IOT control application 122 after a certain period of time, the IOT gateway device 130 may determine that the gateway registration request is not accepted, and may return to procedure 250 to resend the gateway registration request. On the other hand, if the gateway registration request is accepted, at procedure 270, the IOT gateway device may start sending data of the IOT devices 140 to the V-BMC 124 using IPMI messages. In certain embodiments, the data of the IOT devices 140 may be sent to the V-BMC 124 one-by-one in a plurality of IPMI messages. Since each of the IOT devices 140 may include sensors and/or actuators, the respective data of these sensors and/or actuators may be sent or populated in a plurality of IPMI messages. If a new IOT device 140 is added to the IOT gateway device 130, the data of the new IOT device 140 may be sent to the V-BMC 124 using IPMI messages. Similarly, if an IOT device 140 is removed from the IOT gateway device 130, the data of the removal of the IOT device 140 may be sent to the V-BMC 124 using IPMI messages to update the data stored in the V-BMC 124. In certain embodiments, the data of the IOT devices 140 may include data such as the ID, name, type (analog/digital/discrete) and other information of the sensors and/or the actuators. For example, for a sensor of an IOT device 140, a field of the data of the sensor record may be reserved for the current reading of the sensor along with a time stamp, or contain a link to another record which includes the current reading of the sensor. This will ensure the data stored in the V-BMC 124 to provide the last updated sensor data to the IOT software, even if the IOT gateway device 130 may be offline or unreachable. Further, each sensor and/or actuator of each IOT device 140 can also be identified by a respective geographical tag such as Latitude/Longitude or a geographical address. This entry data can be provided in each record stored in the virtual memory of the V-BMC 124, so that each sensor will be addressable and identifiable by the geographical tag. For example, in an AMR system in a multi storied apartment, the IOT gateway device 130 that connected to each and every meter reading sensor is represented by the geographical tag of the apartment, and each IOT device 140 and its corresponding sensor or actuator that is connected to the IOT gateway device 130 will be identified by the geographical tag of the respective house where the sensor is installed and connected to the electricity meter. If required, the V-BMC 124 may also actively request data of the IOT devices 140 using the push technology.

Figure 3:
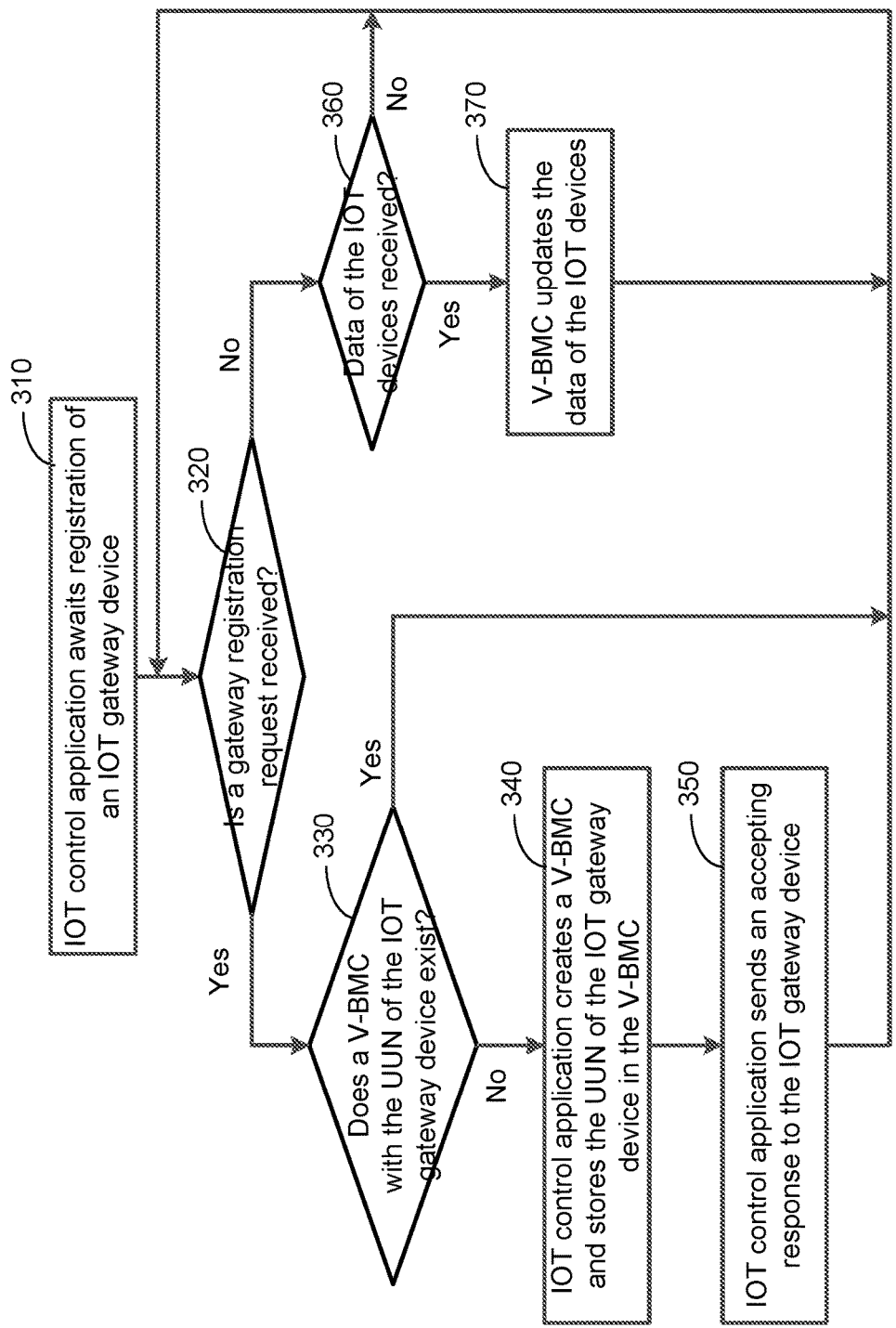
FIG. 3 depicts a process of the IOT control application at the cloud network server registering the IOT gateway device according to certain embodiments of the present disclosure.

FIG. 3 depicts a process of the IOT control application at the cloud network server registering the IOT gateway device according to certain embodiments of the present disclosure. In certain embodiments, the process or method as shown in FIG. 3 may be implemented on a system as shown in FIG. 1A. It should be particularly noted that, unless otherwise stated in the present disclosure, the steps of the method may be arranged in a different sequential order, and are thus not limited to the sequential order as shown in FIG. 3.

As shown in FIG. 3, at procedure 310, the IOT control application 122 awaits for the registration of an IOT gateway device 130. At procedure 320, the IOT control application 122 determines whether a gateway registration request is received. If a gateway registration request is received, at procedure 330, the IOT control application 122 checks the information of the gateway registration request, which includes the UUN of the IOT gateway device 130, and determines whether a V-BMC 124 with the UUN of the IOT gateway device 130 exists. If there is already a V-BMC 124 with the UUN of the IOT gateway device 130, the IOT gateway device 130 is already registered with the V-BMC 124, and no action is required.

On the other hand, if the IOT control application 122 determines that no V-BMC 124 with the UUN of the IOT gateway device 130 exists, at procedure 340, the IOT control application 122 may create a V-BMC 124, and store the UUN of the IOT gateway device 130 in a virtual memory (e.g., the virtual SDR) of the V-BMC 124. At procedure 350, the IOT control application 122 may then send an accepting response to the IOT gateway device 130 to indicate that the IOT gateway device 130 is successfully registered to the virtual BMC 124.

Referring back to the procedure 320, If no gateway registration request is received, at procedure 360, the IOT control application 122 may further check if any data of the IOT devices 140 is received from any of the registered IOT gateway devices 130 using IPMI messages. If a registered IOT gateway device 130 sends the data of the IOT devices 140 by IPMI messages, at procedure 370, the IOT control application 122 controls the corresponding V-BMC 124 to the IOT gateway device 130 to process the IPMI message and update the data of the IOT devices.

Figure 4:
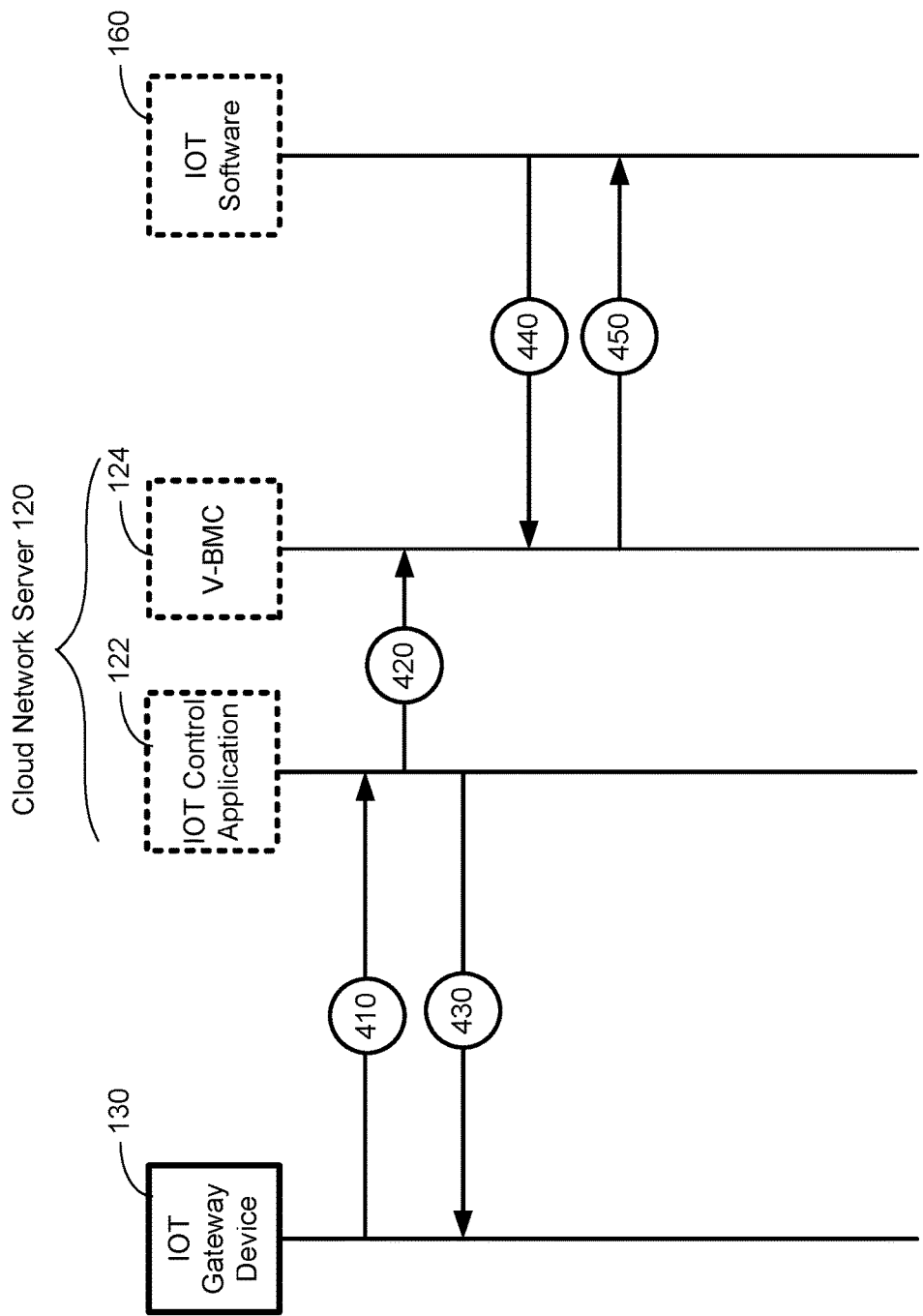
FIG. 4 depicts a process of registering the IOT gateway device and the IOT software respectively according to certain embodiments of the present disclosure.

FIG. 4 depicts a process of registering the IOT gateway device and the IOT software respectively according to certain embodiments of the present disclosure. In certain embodiments, the process or method as shown in FIG. 4 may be implemented on a system as shown in FIG. 1A. It should be particularly noted that, unless otherwise stated in the present disclosure, the steps of the method may be arranged in a different sequential order, and are thus not limited to the sequential order as shown in FIG. 4.

As shown in FIG. 4, at procedure 410, the IOT gateway device 130 may send a gateway registration request to the cloud network server 120. At the cloud network server 120, the IOT control application 122 may receive the gateway registration request, and at procedure 420, the IOT control application 122 creates and configures a V-BMC 124 for the IOT gateway device 130, and stores the UUN of the IOT gateway device 130 in the virtual memory of the V-BMC 124. At procedure 430, the IOT control application 122 sends an accepting response to the IOT gateway device 130 to indicate that the IOT gateway device 130 is now registered to the virtual BMC 124. Details of each of the procedures 410-430 may refer to the flowcharts as shown in FIGS. 2 and 3.

On the other hand, once the IOT gateway device 130 is registered to the V-BMC 124, the V-BMC 124 may be accepting registration from an IOT software 160 to access the IOT gateway device 130. At procedure 440, the V-BMC 124 receives a software registration request from an IOT software 160 executed at the remote computing device 150 for registering the IOT software 160 to the virtual BMC 124. At procedure 450, the V-BMC 124 may return an accepting response to the IOT software 160 to indicate that the IOT software 160 is now registered to the V-BMC 124. In this case, the IOT software 160 registered to the virtual BMC 124 may communicate with the virtual BMC 124 using IPMI messages, and thus may be capable of requesting data from the IOT gateway device 130 or each of the IOT devices 140 connected to the IOT gateway device 139 via the virtual BMC 124. It should be noted that the procedures 440 and 450 are independent from the procedures 410-430. In other words, the registration process of the IOT software 160 is independent from the registration process of the IOT gateway device 130. Further, there may be multiple IOT software applications 160 registering to the same V-BMC 124, such that each IOT software 160 may respectively access the data from the IOT gateway device 130 or each of the IOT devices 140 connected to the IOT gateway device 139 via the virtual BMC 124.

Figure 5:
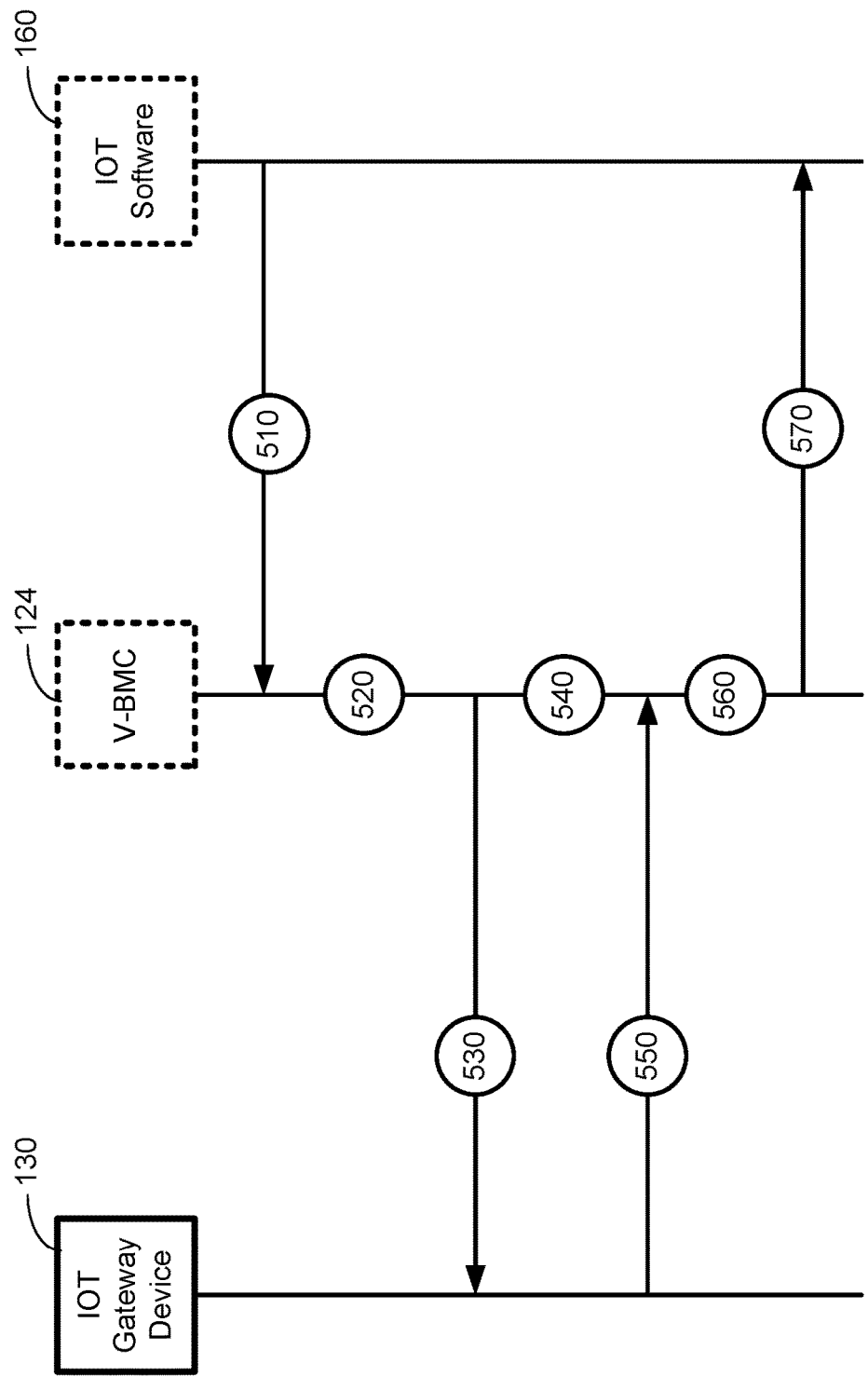
FIG. 5 depicts a process of the IOT software accessing data from the IOT gateway device via the virtual BMC using IPMI messages according to certain embodiments of the present disclosure.

FIG. 5 depicts a process of the IOT software accessing data from the IOT gateway device via the virtual BMC using IPMI messages according to certain embodiments of the present disclosure. In certain embodiments, the process or method as shown in FIG. 5 may be implemented on a system as shown in FIG. 1A. It should be particularly noted that, unless otherwise stated in the present disclosure, the steps of the method may be arranged in a different sequential order, and are thus not limited to the sequential order as shown in FIG. 5.

As shown in FIG. 5, at procedure 510, the IOT software 160 registered to the V-BMC 124 may send an IPMI request message to the virtual BMC 124. In certain embodiments, the IPMI request message may include a gateway access instruction to request the data of the IOT devices 140 from the IOT gateway device 130 registered to the virtual BMC 124. In this case, at procedure 520, the V-BMC 124 receives the IPMI request message, and processes the IPMI request message to retrieve the gateway access instruction. At procedure 530, the V-BMC 124 sends the gateway access instruction to the IOT gateway device 130 by the push technology. It should be noted that the IOT gateway device 130 may be online, or may be in an offline/idle/sleep status. At procedure 540, the V-BMC 124 waits for the response from the IOT gateway device 130. If the IOT gateway device 130 is online, at procedure 550, the IOT gateway device 130 may send an IPMI response message to the V-BMC 124. The IPMI response message may include the data being requested by the gateway access instruction, i.e., the data of the IOT devices 140 communicatively connected to the IOT gateway device 130. When the V-BMC 124 receives the IPMI response message, the V-BMC 124 may determine that the IOT gateway device 130 is online. At procedure 560, the V-BMC 124 may retrieve the data being requested (i.e., the data of the IOT devices 130) from the IPMI response message, and store the data in the virtual memory of the virtual BMC 124. Then, at procedure 570, the V-BMC 124 may forward the IPMI response message to the IOT software 160, such that the IOT software 160 may receive the data being requested.

Referring back to procedure 510, in certain embodiments, the IPMI request message sent by the IOT software 160 may include a device access instruction to request data from a specific target IOT device 140 connected to the IOT gateway device 130. In this case, at procedure 520, the V-BMC 124 receives the IPMI request message, and processes the IPMI request message to retrieve the device access instruction. At procedure 530, the V-BMC 124 sends the device access instruction to the IOT gateway device 130 by the push technology. It should be noted that the IOT gateway device 130 may be online, or may be in an offline/idle/sleep status. At procedure 540, the V-BMC 124 waits for the response from the IOT gateway device 130. If the IOT gateway device 130 is online, at procedure 550, the IOT gateway device 130 may send an IPMI response message to the V-BMC 124. The IPMI response message may include the data being requested by the device access instruction, i.e., the data of the IOT devices 140 communicatively connected to the IOT gateway device 130. When the V-BMC 124 receives the IPMI response message, the V-BMC 124 may determine that the IOT gateway device 130 is online. At procedure 560, the V-BMC 124 may retrieve the data being requested (i.e., the data from a specific target IOT device 140) from the IPMI response message, and store the data in the virtual memory of the virtual BMC 124. Then, at procedure 570, the V-BMC 124 may forward the IPMI response message to the IOT software 160, such that the IOT software 160 may receive the data being requested.

In certain embodiments, at procedure 540, when the V-BMC 124 waits for a certain period of time without getting any response from the IOT gateway device 130, the V-BMC 124 may determine that the status of the IOT gateway device 130 is offline (which may be offline, idle or sleep). In this case, the V-BMC 124 may periodically re-check the on-line status of the IOT gateway device 130 by returning to procedure 530 to send the data (which may be the gateway access instruction or the device access instruction) to the IOT gateway device 130 by the push technology.

In certain embodiments, at procedure 540, when the V-BMC 124 waits for a certain period of time without getting any response from the IOT gateway device 130, the V-BMC 124 may respond to the request from the IOT software 160 by sending the data stored in the virtual memory of the V-BMC 124 back to the IOT software, without waiting for the response from the IOT gateway device 130.

Figure 6:
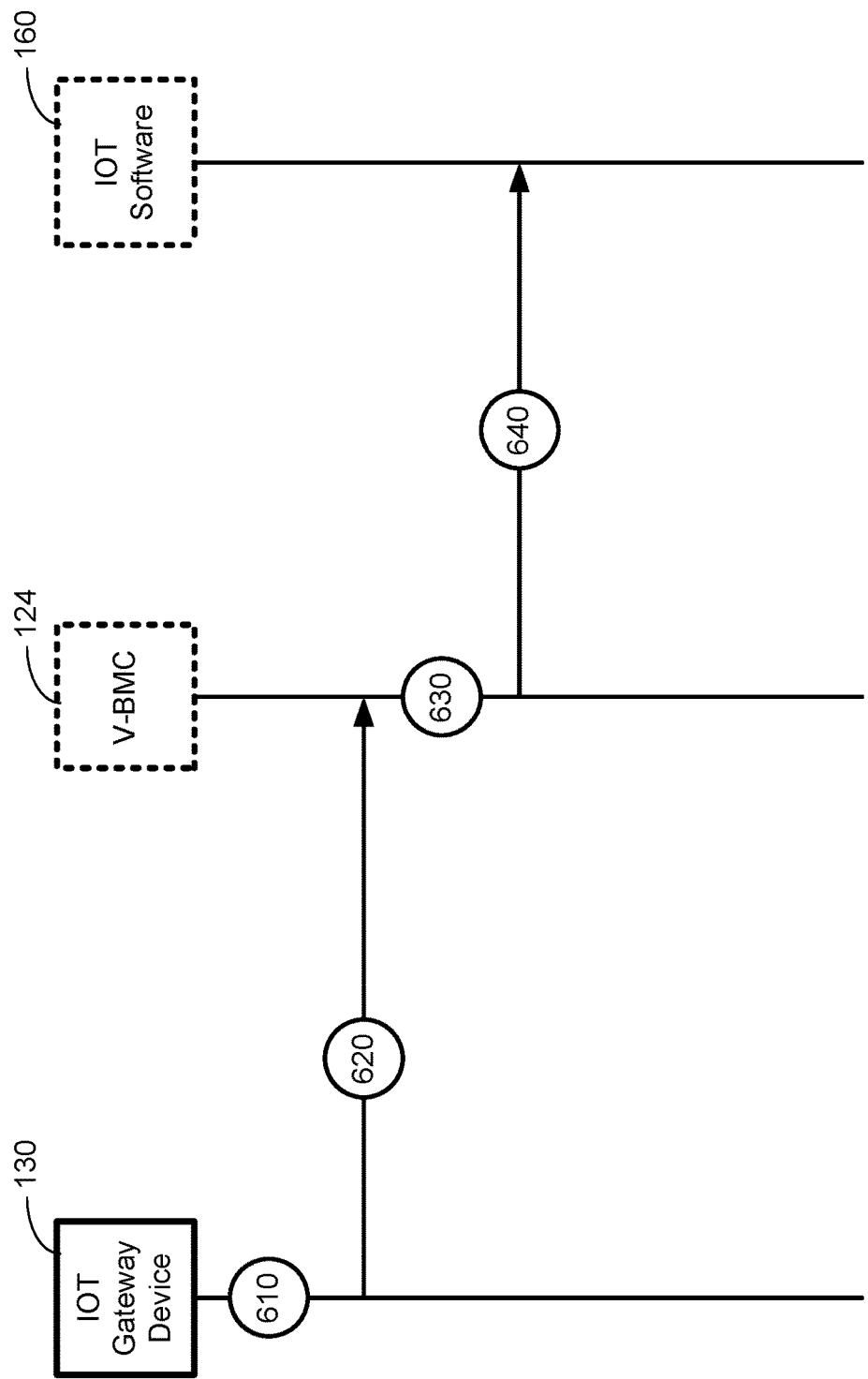
FIG. 6 depicts a process of the IOT gateway device sending alert data to the IOT software via the virtual BMC using IPMI messages according to certain embodiments of the present disclosure.

FIG. 6 depicts a process of the IOT gateway device sending alert data to the IOT software via the virtual BMC using IPMI messages according to certain embodiments of the present disclosure. In certain embodiments, the process or method as shown in FIG. 6 may be implemented on a system as shown in FIG. 1A. It should be particularly noted that, unless otherwise stated in the present disclosure, the steps of the method may be arranged in a different sequential order, and are thus not limited to the sequential order as shown in FIG. 6.

As shown in FIG. 6, at procedure 610, when the IOT gateway device 130 receives an alert message from one of the IOT devices 140, the IOT gateway device 130 generates an IPMI message including the alert message. In certain embodiments, the alert message may correspond to a specific event being detected by one of the IOT devices 140, and may include information of the type of the alert (e.g., SNMP), a destination address (e.g., an IP address) and the event type (e.g., door/window sensor active, smoke alarm triggered, etc.). At procedure 620, the IOT gateway device 130 sends the IPMI message to the V-BMC 124. At procedure 630, the V-BMC 124 receives the IPMI message, and retrieves and store the alert message from the IPMI message. At procedure 640, the V-BMC 124 forwards the IPMI message to the IOT software 160, such that the IOT software 160 receives the alert message.

In one example, if a house is provided with an IOT system, inmates of a house go for a vacation and close the house for a week, the inmates may inform the same to the nearby police station to avoid any mishap like theft in their absence. The police may note down the address of the house and use the IOT software 160 registered to the V-BMC 124 for alerts in case of any of the security/smoke sensors is triggered in the house. The alert messages, if any, will be forwarded to the respective police personal for action.

In certain embodiments, to simplify the software in the IOT gateway devices 130, the alert logic can be implemented in the V-BMC 124 itself. Based on the threshold settings, current sensor values and alert settings, the V-BMC 124 may generate alerts and forward to the registered destinations (i.e., the IOT software 160). This will reduce the software complexity as well as to increase the battery life of the IOT gateway devices 130.

In certain embodiments, an abstraction layer isolates the IOT gateway devices 130 from the corresponding V-BMCs 124. In this way, the different implementation standards used by the different IOT gateway devices 130 may be irrelevant to the V-BMCs 124 and the IOT software 160.

The system and method as described above may be implemented in any IOT system. As an example, if an incident happened in a house where the home security system with IOT devices 140 is installed, with the help of map file, the police can search the database on the cloud network server 120 to know what happened to the house, whether the door or window has been broken, a smoke alarm has been triggered, any burglar sensor has been activated, etc. In this case, the police will provide the street and house number of the house (or Latitude/Longitude information of the house) in the IOT software 140, and the map file will provide the UUN of the IOT gateway device 130 installed in the house. Using the UUN, the respective V-BMC 124 will be located in the cloud network server 120 through the IP address assigned, and SDR repository is available in the V-BMC 124. Using the IPMI command, the value/status of the respective sensor (e.g., front door sensor, window break sensor, PIR motion sensor) will be retrieved from the SDR of the V-BMC 124. This helps the police to get the last updated information from the house, even if security system is tampered or destroyed, or the IOT gateway device 130 is disconnected from the cloud network 110 due to some reasons.

In another example, if an agricultural farm is equipped with the IOT devices 140, an agricultural officer can analyze the activities in the farm if the officer has the authorization to access the cloud database. In this case, the identity of the farm alone is required, which can be area/road/street or Latitude/Longitude information. Using the
IOT software 160 specifically designed for the agricultural farm, the UUN can be retrieved from the map file, and the IOT software 160 can connect to the V-BMC 124 through the mapped IP address and identifies the respective sensor value (such as humidity sensor) in the respective sector of the IOT devices 140 in the farm.

In certain embodiments, as described above, each V-BMC 124 may have a push module to send out data by the push technology. In certain embodiments, the push module may be a push software running in the IOT gateway device 130 registered to the V-BMC 124 for the push notifications from the V-BMC 124. Thus, push registration may be required in the registration process of the IOT gateway device 130. The push registration may contain the unique identification of the UUN of the IOT gateway device 130. Whenever there is a requirement for current data from a sensor or to do an action with an actuator, the IOT software 160 will inform the V-BMC 124, such that the V-BMC 124 will send a push notification to the IOT gateway device 130. Upon receiving the push notification, the IOT gateway device 130 polls the current request (or command), retrieves the sensor data (or activate the actuator) and updates the same to the V-BMC 124 and then to the IOT gateway device 130.

In another aspect, the present disclosure relates to a non-transitory computer readable medium storing computer executable code. In certain embodiments, the computer executable code may include the IOT control application 122 and the V-BMCs 124 at the cloud network server 120, as described above. The computer executable code, when being executed, may perform one of the methods described above. In certain embodiments, the non-transitory computer readable medium may include, but not limited to, the computer storage and memory resources of the cloud network server 120 as described above, or any other storage media on the cloud network 110.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a cloud network server provided on a cloud network, configured to:
  receive a gateway registration request from an internet of things (IOT) gateway device communicatively connected to a plurality of IOT devices;
  in response to the gateway registration request, provide a virtual baseboard management controller (BMC) at the cloud network server, and register the IOT gateway device to the virtual BMC; and
  send an accepting response to the IOT gateway device to indicate that the IOT gateway device is registered to the virtual BMC, wherein the virtual BMC is configured to:
    send information to the IOT gateway device registered to the virtual BMC by a push technology, and
    receive a software registration request from an IOT software executed at a remote computing device for registering the IOT software to the virtual BMC, such that the IOT software registered to the virtual BMC is capable of requesting data from the IOT gateway device or each of the IOT devices connected to the IOT gateway device via the virtual BMC,
  wherein each of the IOT gateway device and the IOT software registered to the virtual BMC is configured to respectively communicate with the virtual BMC by Intelligent Platform Management Interface (IPMI) messages.

2. The system of claim 1, wherein the gateway registration request sent by the IOT gateway device to the cloud network server comprises a universally unique number (UUN) identifying the IOT gateway device, and the UUN is stored in a virtual memory of the virtual BMC to indicate that the IOT gateway device is registered to the virtual BMC.

3. The system of claim 2, wherein the UUN is a universally unique identifier (UUID) of the IOT gateway device, an International Mobile Equipment Identity (IMEI) number of the IOT gateway device, a media access control (MAC) address of the IOT gateway device, or a custom identification number mapped to geographical information of the IOT gateway device.

4. The system of claim 1, wherein the virtual BMC is configured to send the information to the IOT gateway device registered to the virtual BMC by the push technology by:
 detecting an on-line status of the IOT gateway device; and
 when the on-line status of the IOT gateway device indicates the IOT gateway device to be offline, periodically re-checking the on-line status of the IOT gateway device.

5. The system of claim 1, wherein the virtual BMC is configured to register the IOT software executed at the remote computing device by:
 in response to the software registration request, sending an accepting response to the IOT software executed at the remote computing device to indicate that the IOT software is registered to the virtual BMC.

6. The system of claim 1, wherein the virtual BMC is further configured to:
 receive a first IPMI message from the IOT gateway device registered to the virtual BMC, wherein the first IPMI message comprises data of the IOT devices communicatively connected to the IOT gateway device registered to the virtual BMC; and
 retrieve the data of the IOT devices from the first IPMI message, and store the data of the IOT devices in a virtual memory of the virtual BMC.

7. The system of claim 6, wherein the virtual BMC is further configured to:
 receive a first IPMI request message from the IOT software registered to the virtual BMC, wherein the first IPMI request message comprises a gateway access instruction to request the data of the IOT devices from the IOT gateway device registered to the virtual BMC;
 send the gateway access instruction to the IOT gateway device by the push technology;
 receive a first IPMI response message as the first IPMI message from the IOT gateway device; and
 respond to the gateway access instruction by sending the first IPMI response message to the IOT software.

8. The system of claim 7, wherein the virtual BMC is further configured to:
 in response to not receiving the IPMI response message from the IOT gateway device, respond to the gateway access instruction by:
  generating a second IPMI message comprising the data of the IOT devices in a virtual memory of the virtual BMC, and
  sending the second IPMI message to the IOT software.

9. The system of claim 7, wherein the virtual BMC is further configured to:
 receive a second IPMI request message from the IOT software registered to the virtual BMC, wherein the second IPMI request message comprises a device access instruction to request data from a target IOT device of the IOT devices;
 send the device access instruction to the IOT gateway device by the push technology;
 receive a second IPMI response message from the IOT gateway device, wherein the second IPMI response message comprises the data being requested from the target IOT device; and
 respond to the device access instruction by sending the second IPMI response to the IOT software.

10. The system of claim 7, wherein the virtual BMC is further configured to:
 receive a third IPMI message from the IOT gateway device registered to the virtual BMC, wherein the third IPMI message comprises an alert from one of the IOT devices; and
 send the third IPMI message to the IOT software registered to the virtual BMC.

11. A method for controlling an internet of things (IOT) system, comprising:
 receiving, at a cloud network server, a gateway registration request from an IOT gateway device communicatively connected to a plurality of IOT devices;
 in response to the gateway registration request, providing a virtual baseboard management controller (BMC) at the cloud network server, and registering the IOT gateway device to the virtual BMC; and
 sending, by the cloud network server, an accepting response to the IOT gateway device to indicate that the IOT gateway device is registered to the virtual BMC,
 wherein the virtual BMC is configured to:
  send information to the IOT gateway device registered to the virtual BMC by a push technology, and
  receive a software registration request from an IOT software executed at a remote computing device for registering the IOT software to the virtual BMC, such that the IOT software registered to the virtual BMC is capable of requesting data from the IOT gateway device or each of the IOT devices connected to the IOT gateway device via the virtual BMC,
 wherein each of the IOT gateway device and the IOT software registered to the virtual BMC is configured to communicate with the virtual BMC by Intelligent Platform Management Interface (IPMI) messages.

12. The method of claim 11, wherein the gateway registration request sent by the IOT gateway device to the cloud network server comprises a universally unique number (UUN) identifying the IOT gateway device, and the UUN is stored in a virtual memory of the virtual BMC to indicate that the IOT gateway device is registered to the virtual BMC, wherein the UUN is a universally unique identifier (UUID) of the IOT gateway device, an International Mobile Equipment Identity (IMEI) number of the IOT gateway device, a media access control (MAC) address of the IOT gateway device, or a custom identification number mapped to geographical information of the IOT gateway device.

13. The method of claim 11, wherein the virtual BMC is configured to send the information to the IOT gateway device registered to the virtual BMC by the push technology by:
 detecting an on-line status of the IOT gateway device;
 when the on-line status of the IOT gateway device indicates the IOT gateway device to be offline, periodically re-checking the on-line status of the IOT gateway device.

14. The method of claim 11, wherein the virtual BMC is configured to register the IOT software executed at the remote computing device by:
 in response to the software registration request, sending an accepting response to the IOT software executed at the remote computing device to indicate that the IOT software is registered to the virtual BMC.

15. The method of claim 11, wherein the virtual BMC is further configured to:
 receive a first IPMI message from the IOT gateway device registered to the virtual BMC, wherein the first IPMI message comprises data of the IOT devices communicatively connected to the IOT gateway device registered to the virtual BMC; and retrieve the data of the IOT devices from the first IPMI message, and store the data of the IOT devices in a virtual memory of the virtual BMC.

16. The method of claim 15, wherein the virtual BMC is further configured to:
 receive a first IPMI request message from the IOT software registered to the virtual BMC, wherein the first IPMI request message comprises a gateway access instruction to request the data of the IOT devices from the IOT gateway device registered to the virtual BMC;
 send the gateway access instruction to the IOT gateway device by the push technology;
 in response to receiving a first IPMI response message as the first IPMI message from the IOT gateway device, respond to the gateway access instruction by sending the first IPMI response message to the IOT software; and
 in response to not receiving the IPMI response message from the IOT gateway device, respond to the gateway access instruction by:
  generating a second IPMI message comprising the data of the IOT devices in a virtual memory of the virtual BMC, and
  sending the second IPMI message to the IOT software.

17. The method of claim 16, wherein the virtual BMC is further configured to:
 receive a second IPMI request message from the IOT software registered to the virtual BMC, wherein the second IPMI request message comprises a device access instruction to request data from a target IOT device of the IOT devices;
 send the device access instruction to the IOT gateway device by the push technology;
 receive a second IPMI response message from the IOT gateway device, wherein the second IPMI response message comprises the data being requested from the target IOT device; and
 respond to the device access instruction by sending the second IPMI response to the IOT software.

18. The method of claim 16, wherein the virtual BMC is further configured to:
 receive a third IPMI message from the IOT gateway device registered to the virtual BMC, wherein the third IPMI message comprises an alert from one of the IOT devices; and
 send the third IPMI message to the IOT software registered to the virtual BMC.

19. A non-transitory computer readable medium storing computer executable code, wherein the computer executable code, when executed at a processor of a cloud network server provided on a cloud network, is configured to:
 receive a gateway registration request from an internet of things (IOT) gateway device communicatively connected to a plurality of IOT devices;
 in response to the gateway registration request, provide a virtual baseboard management controller (BMC) at the cloud network server, and register the IOT gateway device to the virtual BMC; and
 send an accepting response to the IOT gateway device to indicate that the IOT gateway device is registered to the virtual BMC,
 wherein the virtual BMC is configured to:
  send information to the IOT gateway device registered to the virtual BMC by a push technology, and
  receive a software registration request from an IOT software executed at a remote computing device for registering the IOT software to the virtual BMC, such that the IOT software registered to the virtual BMC is capable of requesting data from the IOT gateway device or each of the IOT devices connected to the IOT gateway device via the virtual BMC,
 wherein each of the IOT gateway device and the IOT software registered to the virtual BMC is configured to communicate with the virtual BMC by Intelligent Platform Management Interface (IPMI) messages.

20. The non-transitory computer readable medium of claim 19, wherein the gateway registration request sent by the IOT gateway device to the cloud network server comprises a universally unique number (UUN) identifying the IOT gateway device, and the UUN is stored in a virtual memory of the virtual BMC to indicate that the IOT gateway device is registered to the virtual BMC, wherein the UUN is a universally unique identifier (UUID) of the IOT gateway device, an International Mobile Equipment Identity (IMEI) number of the IOT gateway device, a media access control (MAC) address of the IOT gateway device, or a custom identification number mapped to geographical information of the IOT gateway device.

21. The non-transitory computer readable medium of claim 19, wherein the virtual BMC is configured to register the IOT software executed at the remote computing device by:
 in response to the software registration request, sending an accepting response to the IOT software executed at the remote computing device to indicate that the IOT software is registered to the virtual BMC.

22. The non-transitory computer readable medium of claim 19, wherein the virtual BMC is further configured to:
 receive a first IPMI message from the IOT gateway device registered to the virtual BMC, wherein the first IPMI message comprises data of the IOT devices communicatively connected to the IOT gateway device registered to the virtual BMC; and
 retrieve the data of the IOT devices from the first IPMI message, and store the data of the IOT devices in a virtual memory of the virtual BMC.

23. The non-transitory computer readable medium of claim 22, wherein the virtual BMC is further configured to:
 receive a first IPMI request message from the IOT software registered to the virtual BMC, wherein the first IPMI request message comprises a gateway access instruction to request the data of the IOT devices from the IOT gateway device registered to the virtual BMC;
 send the gateway access instruction to the IOT gateway device by the push technology;
 in response to receiving a first IPMI response message as the first IPMI message from the IOT gateway device, respond to the gateway access instruction by sending the first IPMI response message to the IOT software; and
 in response to not receiving the IPMI response message from the IOT gateway device, respond to the gateway access instruction by:
  generating a second IPMI message comprising the data of the IOT devices in a virtual memory of the virtual BMC, and
  sending the second IPMI message to the IOT software.

24. The non-transitory computer readable medium of claim 23, wherein the virtual BMC is further configured to:
 receive a second IPMI request message from the IOT software registered to the virtual BMC, wherein the second IPMI request message comprises a device access instruction to request data from a target IOT device of the IOT devices;

send the device access instruction to the IOT gateway device by the push technology;

receive a second IPMI response message from the IOT gateway device, wherein the second IPMI response message comprises the data being requested from the target IOT device; and respond to the device access instruction by sending the second IPMI response to the IOT software.

25. The non-transitory computer readable medium of claim 23, wherein the virtual BMC is further configured to:

receive a third IPMI message from the IOT gateway device registered to the virtual BMC, wherein the third IPMI message comprises an alert from one of the IOT devices; and send the third IPMI message to the IOT software registered to the virtual BMC.

* * * * *